(No Model.) 2 Sheets—Sheet 1.
H. W. BUDDICOM.
APPARATUS FOR DIPPING OR CLEANSING TIN OR TERNE PLATES.
No. 392,101. Patented Oct. 30, 1888.
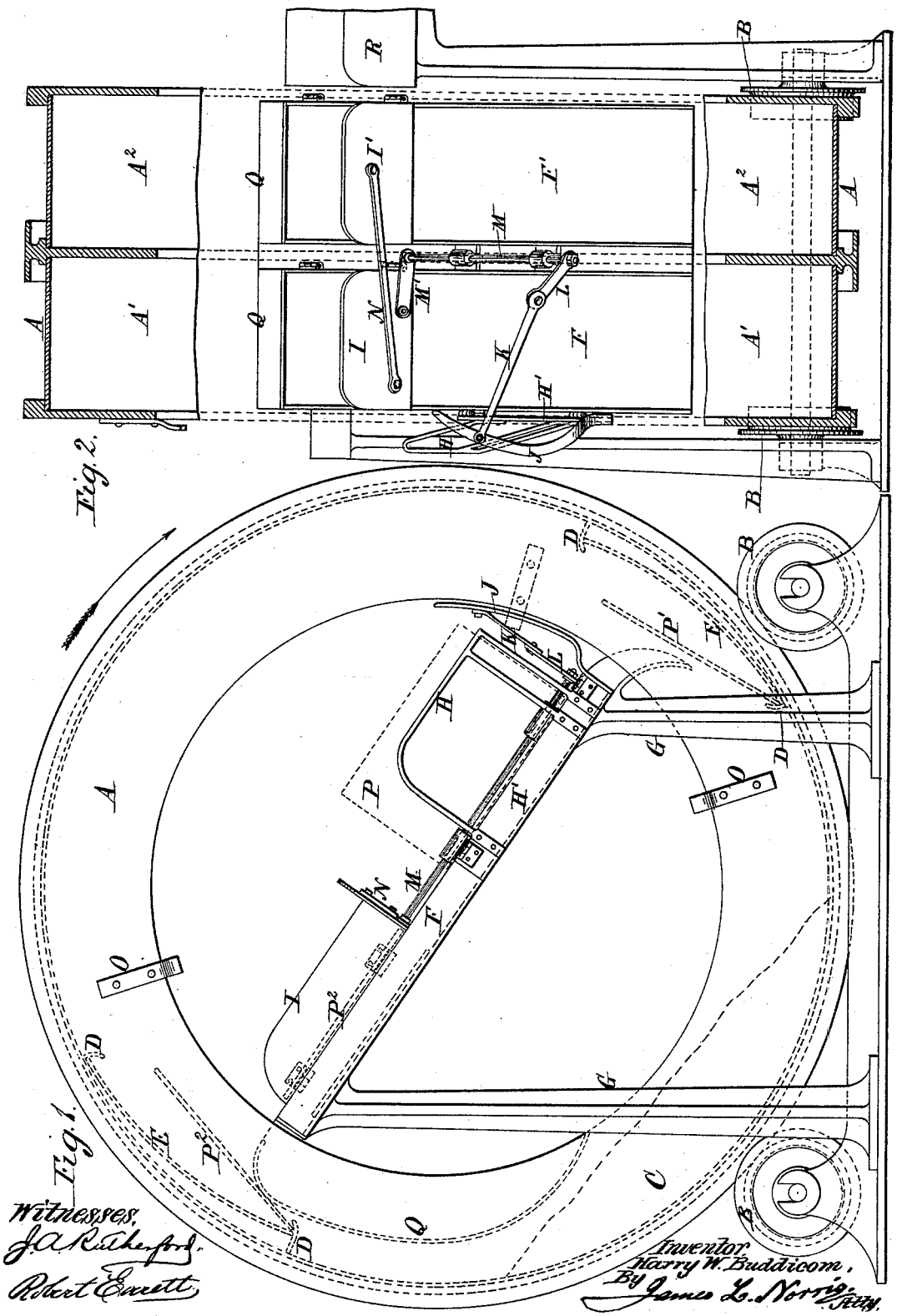

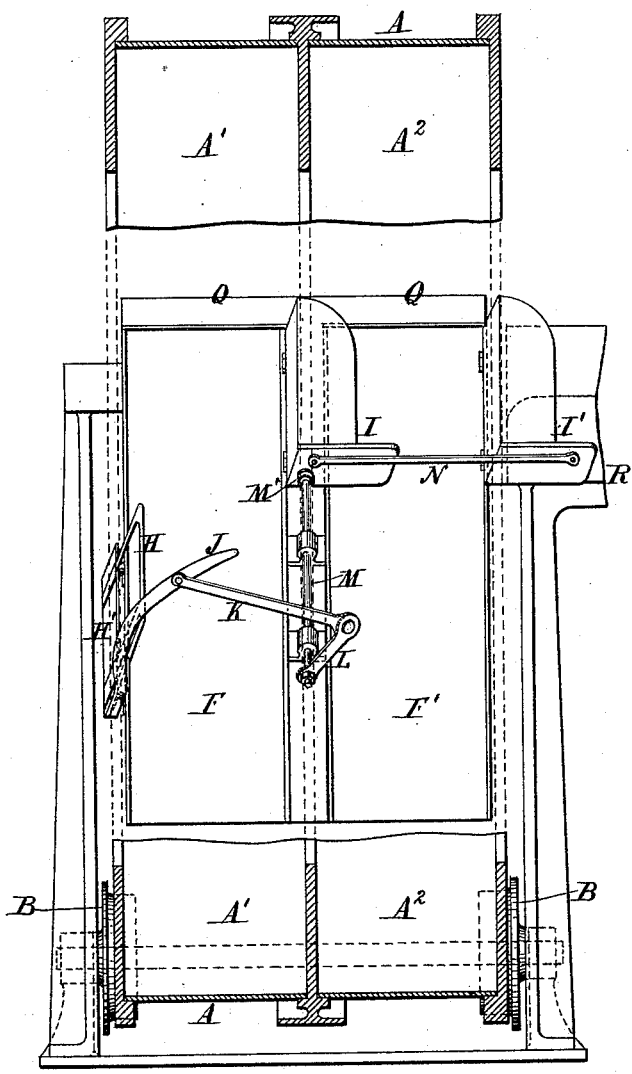

UNITED STATES PATENT OFFICE.

HARRY W. BUDDICOM, OF PEN-Y-POUND, ABERGAVENNY, COUNTY OF MONMOUTH, ENGLAND.

APPARATUS FOR DIPPING OR CLEANSING TIN OR TERNE PLATES

SPECIFICATION forming part of Letters Patent No. 392,101, dated October 30, 1888.

Application filed February 9, 1888. Serial No. 263,556. (No model.)

*To all whom it may concern:*

Be it known that I, HARRY WILLIAM BUDDICOM, a subject of the Queen of Great Britain, residing at Pen-y-Pound, Abergavenny, in the county of Monmouth, England, have invented a new and useful Improved Apparatus for Dipping or Cleansing Tin and Terne Plates, of which the following is a specification.

My invention has reference to an improved construction of apparatus for dipping or cleansing tin and terne plates by means of bran or other suitable granular material after they are removed from an oil bath. According to my invention the plates are introduced into vertically-arranged annular revolving troughs containing bran or other cleansing material, which as the troughs revolved is thereby caused to tumble over and over, so as practically to remain in one and the same position on the rising side of the trough, so that as the plates are placed between catches on the descending side of the trough they are in traveling round with the same carried through the stationary layer of bran and become cleansed by the rubbing action of the bran to which they are thus subjected. The plates may be so placed in the trough that they pass about midway through the thickness of the layer of bran, so as to be acted upon more or less equally on both sides at the same time, whereby the cleansing operation may be more or less perfectly carried out by merely continuing the rotation of the trough any required number of times with the plate or plates in the same position, after which they are removed; but by preference I provide arrangements whereby the plate, after having passed through the bran, has its position reversed either in the same trough or in a second one, so that the side which was undermost, and was therefore less subjected to the rubbing action than the other side, is then uppermost as it passes through. In order to render the action of the apparatus a continuous one, I prefer to arrange two or more such annular troughs side by side and to cause the plates, after they have been passed through the bran in the first trough, to be automatically turned over and at the same time conveyed into the next trough, where they are again subjected to the same operation, and so on if there are more than two troughs, the plates being automatically delivered out of the last trough.

On the accompanying drawings is shown the arrangement of the before-described apparatus which I prefer to employ.

Figure 1 shows a front elevation; Fig. 2, a cross-section, and Fig. 3 a view similar to Fig. 2 with the hinged reversing flaps in their raised position.

A is a drum containing two annular troughs, $A'$ $A^2$, the drum being supported upon rollers B and rotated in the direction of the arrow by any suitable means. Each trough contains a body of bran or other suitable granular material, C, which, as the troughs slowly rotate, falls over and over, so as to permanently assume about the position shown. In the bottoms of the troughs are fixed projecting pins or catches D D for holding the plates to be acted upon, bars E being by preference arranged between the catches raised up from the bottom of the trough, so that the plate in resting thereon has its under side more or less exposed to the rubbing action of the bran as it is carried through the same.

Within the troughs $A'$ $A^2$ are arranged two stationary inclines, F F', supported by standards G. The incline F has, first, at its lower end a guard, H, for the reception of the plates to be acted upon, which guard is fixed to a plate, H', hinged to its outer side of the incline F, and said incline F has at the upper end a flap, I, hinged to its inner side. The plate H' of the guard H carries a cam-shaped arm, J, connected by a rod, K, to a lever, L, on a spindle, M, carried in brackets on the inner side of the incline F and fixed to an arm, M', on the flap I. This flap is connected by a rod, N, with a similar hinged flap, I', on the incline F'. The action is as follows:

The drum A is provided with two tappets, O O, which as it rotates bear against the arm J, as indicated by dotted lines, Fig. 1, and thereby turn the guard H and plate H' inward from the position shown in Figs. 1 and 2 to the position shown in Fig. 3, so that a tin-plate, P, which had been placed upon it by the workman is thrown down onto the incline F, from which it slides down and falls from the curved end thereof into the trough A' between the catches D D, as indicated by the dotted position at P'. In this position the plate is carried through the bran at C, as described, and, in rising up beyond this, falls against a curved guard, Q, fixed to the upper end of the incline F, so as eventually to fall onto the latter, as indicated at $P^2$, where it slides down onto the flap I. By the time the plate has arrived in this position the second tappet O will have arrived at the arm J, and in acting upon this will first cause another plate to be delivered from H onto F, and, secondly, by turning the spindle M will cause the two flaps I I' to be raised into the vertical position shown at Fig. 3, whereby the plate $P^2$, lying on I, will be turned over onto the slide F' underneath the flap I', and will slide down this into the trough $A^2$, in which it will be received by catches D, and will then be carried up through the layer of bran contained in this trough. On passing up the plate will again be led by a guide, Q, onto the flap I' of incline F', and this being then tilted up simultaneously with I, as before described, the plate will be delivered thereby onto the table R, whence it is removed by the attendant. It will be seen that as the plate P falls from F and F' into troughs A' and $A^2$ it is turned over, and that it is also turned over when it is delivered from trough A' onto flap I, which again turns it over as it delivers the plate onto the incline F'. By this means the one side of the plate is presented uppermost as it is carried through the bran in trough A', and the other side is uppermost when it is carried through the bran in $A^2$, so that both sides are equally acted upon before the plate passes out of the machine. The plates still require dusting after removal from this apparatus. The guard H and flaps I I' are brought back into their original positions after having been tilted either by balance-weights or springs.

It will be evident that there might be a series of three or more troughs instead of two, or that only one might be employed, in which case the lower part of the slide would be so arranged as to deliver the plate onto the trough without being turned over, in order that after being passed through the bran with one side uppermost, and being then turned over onto the slide F with its other side uppermost, it may be delivered onto the trough and be carried through the bran in this position. On being delivered to the slide after passing the second time through the bran the plate would in this case be removed by hand.

Having thus described the nature of this invention and the best means I know of carrying the same into practical effect, I claim—

1. An apparatus for dipping or cleansing tin and terne plates, consisting of an annular trough adapted to revolve in a vertical plane, and containing a layer of bran or other granular material, and having catches or appliances whereby the plates to be cleaned are carried around through the layer of bran, which in falling over always remains in about the same position in the trough, and means whereby the trough may be revolved, substantially as herein described.

2. An apparatus for dipping or cleansing tin and terne plates, consisting of an annular trough adapted to revolve in a vertical plane, and containing a layer of bran or other granular material, and having catches or appliances whereby the plates to be cleaned are carried round through the bran, which remains in about the same position, a stationary inclined chute within the trough, onto which the plate is delivered in an inverted position after it has passed through the bran, and from which it slides down into the trough again in order to be passed through the bran in the inverted position, and means whereby the trough may be revolved, substantially as herein described.

3. An apparatus for dipping or cleansing tin and terne plates, consisting of a series of annular troughs arranged side by side and adapted to revolve in vertical planes, and containing a layer of bran or other granular material, and having catches or appliances whereby the plates to be cleansed are carried round through the bran, which remains in about the same position, stationary inclined chutes within each trough, having each a hinged flap at the upper end for receiving the plates after passing through the bran, a cam-lever connected to the flaps and acted upon by tappets on the revolving trough, so as to raise the flaps after the plates have deposited thereon and cause these to be turned over and delivered onto the chute in the next trough, and means whereby the troughs may be revolved, substantially as herein described.

In testimony whereof I have signed my name to this specification, in the presence of two subscribing witnesses, this 26th day of January, A. D. 1888.

HARRY W. BUDDICOM.

Witnesses:
 OLIVER IMRAY,
*Patent Agent, 28 Southampton Buildings, London, W. C.*
 JNO. P. M. MILLARD,
*Clerk to Messrs. Abel & Imray, Consulting Engineers and Patent Agents, 28 Southampton Buildings, London, W. C.*